Oct. 7, 1947.  W. H. ELLIOT  2,428,702
ELECTRONIC MOTOR CONTROL
Filed Aug. 31, 1944
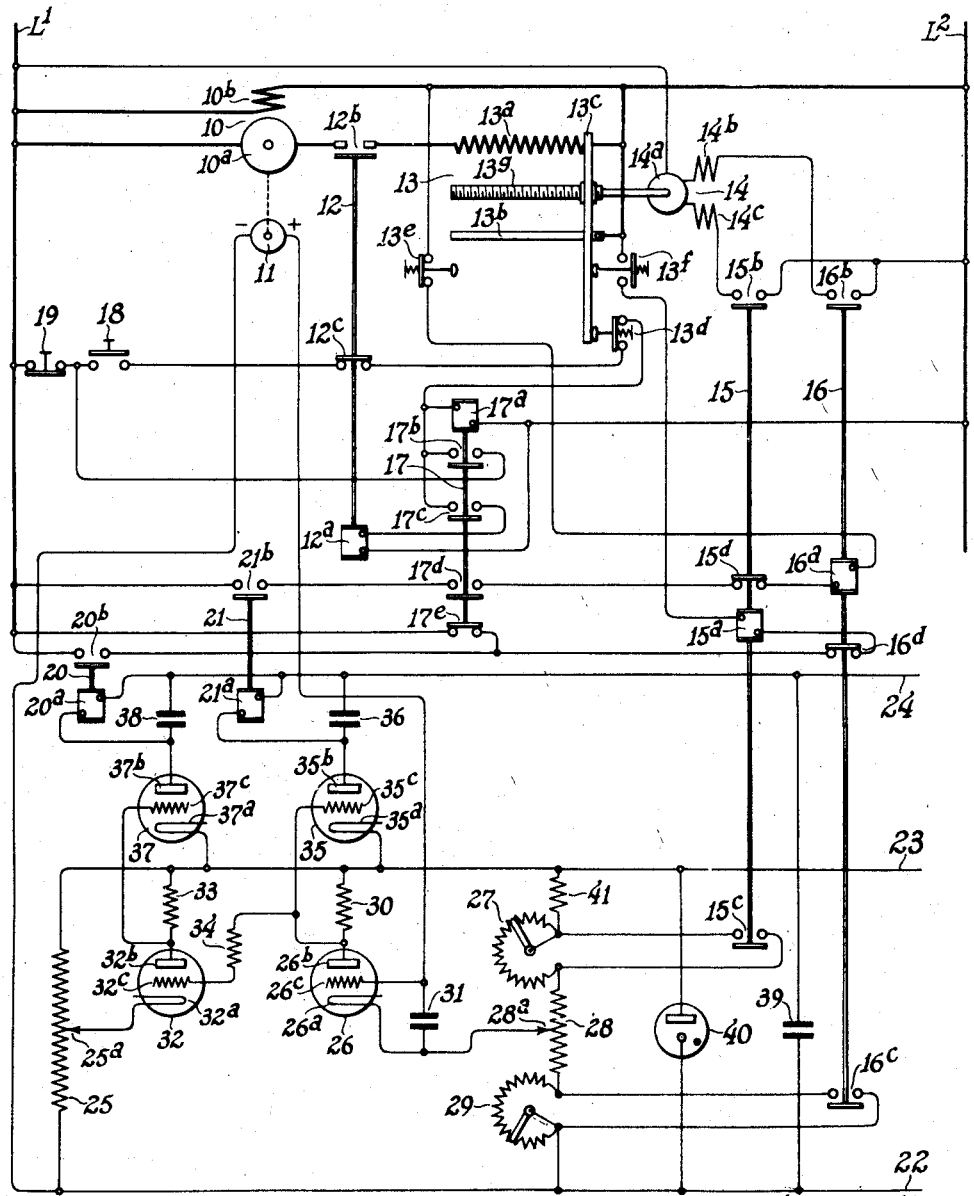
Inventor
William H. Elliot
By Fred H. Hubbard
Attorney Patented Oct. 7, 1947

2,428,702

UNITED STATES PATENT OFFICE 2,428,702

ELECTRONIC MOTOR CONTROL

William H. Elliot, Shorewood, Wis., assignor to Cutler-Hammer, Inc., Milwaukee, Wis., a corporation of Delaware Application August 31, 1944, Serial No. 552,183

8 Claims. (Cl. 172—179)

1

This invention relates to the control of energy supplied to a translating device in accordance with an operating characteristic of said device, and while adapted to many uses it is particularly applicable for the automatic speed control of electric motors.

In accordance with the invention a voltage which is a function of an operating characteristic of the device to be controlled is impressed upon a system of electronic devices which amplify such voltage and in turn supply a control current of such direction and magnitude as will produce the desired controlling effect upon the device to be controlled.

An object of the invention is to provide for accurate control of an operating characteristic of a translating device.

Another object is to provide a control of the aforementioned type which is substantially without time delay and therefore instantaneous in response.

Another object is to provide a control of the aforementioned type which affords a large controlling effect for small departures from the desired condition.

Another object is to provide a rapid control system for the control of dynamo electric machines.

Another object is to provide an automatic speed regulating system for a motor, affording a wide range of speeds.

Another object is to provide an extremely sensitive system for maintaining a motor at a constant desired speed.

Another object is to provide an extremely sensitive system for maintaining constant an operating characteristic of a translating device.

Other objects and advantages will hereinafter appear.

The accompanying diagram is illustrative of an embodiment of the invention in a direct current motor speed control system. In the drawing the numeral 10 designates a direct current motor which is to be supplied with direct current energy from the bus bars L¹, L². The motor 10 is provided with an armature 10ª and a separately excited field winding 10ᵇ, which latter is directly connected across the bus bars L¹ and L². It is of course understood that a regulator may be employed for controlling the energization of the field winding 10ᵇ, but as the same is not essential for an explanation of the operation of the invention it has been omitted from the diagram. Connected to the motor shaft is an electric tachometer 11 which may be of any type whose output voltage is directly proportional to the speed of the motor armature. As will be obvious to those skilled in the art, the tachometer shown diagrammatically in the drawing may be replaced by any suitable responsive device. One terminal of the motor armature 10ª is connected to the bus bar L¹, while the second terminal is connected through the normally open main contacts 12ᵇ of an electromagnetic switch 12 to one terminal of a variable resistor 13ª of a resistance commutator 13. The second terminal of the resistor 13ª is connected to the line L². The electromagnetic switch 12 is also provided with an energizing winding 12ª and normally closed auxiliary contacts 12ᶜ. Besides the variable resistor 13ª the commutator 13 is provided with a segment 13ᵇ and a cross-head 13ᶜ which makes contact with the resistor 13ª and the segment 13ᵇ. As the segment 13ᵇ is connected to the line L², the cross-head upon being reciprocated short circuits more or less of the resistor 13ª. In the position shown in the diagram all of the resistance of the resistor 13ª is in series with the motor armature and as the cross-head moves toward the left resistance is cut out of the motor circuit until in the extreme left-hand position the resistor 13ª is completely short circuited. The cross-head is further equipped with abutments which actuate the limit switches 13ᵈ, 13ᵉ, and 13ᶠ. The limit switch 13ᵈ has normally open contacts which are closed when the cross-head reaches the extreme right-hand position. The limit switch 13ᵉ has normally closed contacts which are opened when the cross-head reaches its extreme left-hand position and the limit switch 13ᶠ has normally closed contacts which are opened when the cross-head reaches its extreme right-hand position. The cross-head 13ᶜ is provided with a threaded nut which engages a threaded shaft 13ᵍ, which upon rotation reciprocates the cross-head. The shaft 13ᵍ is driven by a reversing pilot motor 14, having an armature 14ª and reversing windings 14ᵇ and 14ᶜ. One or the other of said reversing windings may be connected in circuit with the armature. When the winding 14ᵇ is in circuit the motor 14 revolves in a direction to move the crosshead to the left, whereas when the winding 14ᶜ is energized the motor 14 operates in the reverse direction to move the crosshead to the right.

The energization of the pilot motor 14 in the forward and reverse directions is controlled by a pair of relays 15 and 16. The relay 15 is provided with an energizing winding 15ª, normally open contacts 15ᵇ and 15ᶜ, and normally closed contacts 15ᵈ, while relay 16 is provided with an energizing winding 16ª, normally open contacts 16ᵇ and 16ᶜ, and normally closed contacts 16ᵈ. The system further includes a relay 17 having an energizing winding 17ª, normally open contacts 17ᵇ 17ᶜ, and 17ᵈ, and normally closed contacts 17ᵉ. The operation of the system may be started or stopped by depressing a starting push button 18 having normally open contacts or a stop push button 19 having normally closed contacts.

Enerization of the relays 15 and 16 in response to the voltage of the tachometer 11 is controlled by electromagnetic relays 20 and 21, respectively. The relays are each provided with an energizing winding 20ª and 21ª, respectively, and normally open contacts 20ᵇ and 21ᵇ, respectively. The energization of the relays 20 and 21 in turn is controlled by an electronic controller which is supplied with current from direct current bus bars 22, 23, and 24. The bus bar 22 may be at ground potential, while the potential of the bus bars 23 and 24, with respect to the bus bar 22 is plus 90 volts and plus 300 volts, respectively.

Connected across the bus bars 22 and 23 is a voltage dividing resistor 25, having a movable contact 25ª. The system further includes an electronic tube 26 having a cathode 26ª, an anode 26ᵇ, and a control electrode 26ᶜ. Connected across the bus bars 22 and 23 and in series with each other are also a fixed resistor 41, the anti-hunting voltage dividing resistor 27, the voltage dividing resistor 28 for adjusting the sensitivity of the system, and the anti-hunting voltage dividing resistor 29. The cathode 26ª is connected to the movable contact 28ª of the resistor 28. The anode of the tube 26 is connected to the bus bar 23 through a resistor 30. The control electrode 26ᶜ is connected to the cathode 26ª through a capacitor 31 and is also connected to the positive terminal of the tachometer 11. Connected to the movable contact 25ª is the cathode 32ª of an electronic tube 32. The tube 32 also has an anode 32ᵇ, and a control electrode 32ᶜ. The anode 32ᵇ is connected to the bus bar 23 through a resistor 33, while the control electrode 32ᶜ is connected to the anode 26ᵇ, through a resistor 34.

One terminal of the energizing winding 21ª is connected to the bus bar 24, while the other terminal is connected to the anode 35ᵇ of an electron tube 35, the cathode 35ª of which is connected to the bus bar 23, while its control electrode 35ᶜ is connected to the anode 26ᵇ. A smoothing capacitor 36 is connected across the terminals of the energizing winding 21ª. One terminal of the energizing winding 20ª is connected to the bus bar 24, while the other terminal is connected to the anode 37ᵇ of an electron tube 37, which has a cathode 37ª connected to the bus bar 23, and a control electrode 37ᶜ connected to the anode 32ᵇ. Connected across the terminals of the energizing winding 20ª is a smoothing capacitor 38. Another smoothing capacitor 39 is connected between the bus bars 22 and 24, while a voltage regulating tube 40 is connected between the bus bars 22 and 23.

The connection and operation of the system will now be described. Assuming that the system is in the position shown in the diagram and the motor 10 is at rest while the bus bars L¹ and L², and 22, 23 and 24 are energized and it is desired to start the motor 10. The operator pushes the starting button 18 thereby establishing a circuit from line L¹ through the contacts of switches 19 and 18, through the contacts 12ᶜ and 13ᵈ, the energizing winding 17ª, to line L². Thereupon the relay 17 responds and closes the contacts 17ᵇ. This establishes a maintaining circuit from line L¹, through contacts 19, 17ᵇ, the energizing winding 17ª, to line L², and the starting button 18 may be released, while the relay 17 remains energized. At the same time the contacts 17ᶜ close and an additional circuit is established through contacts 17ᵇ, 17ᶜ, energizing coil 12ª, to line L². This actuates the switch 12 which thereupon closes its normally open contacts 12ᵇ, while contacts 12ᶜ open. The opening of contact 13ᵈ has no effect, as it is paralleled by the maintaining circuit through contact 17ᵇ. The closure of contacts 12ᵇ completes a circuit from line L¹, through the armature 10ª, contacts 12ᵇ, through the resistor 13ª, through the cross-head 13ᶜ, to the segment 13ᵇ and from there to the line L². This causes the motor 10 to start with all resistance in circuit and it will run at the lowest speed.

The tachometer generator 11 rotates with the motor 10. The speed at which the motor 10 operates after starting is determined by the adjustment of the resistor 28. It will be observed that the terminal voltage of the tachometer 11 is impressed between the grid 26ᶜ and the bus bar 22.

Let it be further assumed that the contact 28ª of the speed regulating resistor 28 is in the position corresponding to minimum desired speed of the motor. In this position the cathode 26ª has a potential which is slightly positive with respect to that of the grid 26ᶜ, as at the moment of starting the terminal voltage of the tachometer 11 is zero. The tube 26 is therefore conducting only very small current so that there is no substantial voltage drop through the resistor 30 and the grid 32ᶜ attains substantially the potential of the bus bar 23 which is positive with respect to the cathode 32ª. The tube 32 will therefore conduct a relatively high current which results in a substantial voltage drop through the resistor 33 so that the grid 37ᶜ is negative with respect to the cathode 37a, and this prevents the tube 37 from conducting sufficient energizing current from the relay coil 20ª to actuate the relay 20. However, the grid 35ᶜ also has substantially the potential of the bus bar 23, which is equal to the potential of the cathode 35ª. Under these conditions the tube 35 passes a current to the relay coil 21ª which is sufficient to actuate the relay 21 to close the contacts 21ᵇ, thereby establishing a circuit from line L¹, through contacts 21ᵇ, 17ᵈ, 15ᵈ, energizing coil 16ª, limit switch 13ᵉ to line L². This causes response of the relay 16 which in turn energizes the motor 14 through a circuit from line L¹, through the armature 14ª, the winding 14ᵇ, contact 16ᵇ to line L². The motor 14 revolves to move the cross-head to the left which reduces the resistance of the resistor 13ª, in the circuit of the motor 10 thus accelerating it. Upon acceleration of the motor 10 the voltage of the tachometer generator 11 increases. This raises the voltage of the grid 26ᶜ until ultimately the tube 26 becomes conducting, thereby producing a voltage drop through the resistor 30, which lowers the potential of the grids 32ᶜ and 35ᶜ, thus decreasing the current in the tubes 32 and 35, until the current of relay coil 21ª is reduced to a value at which it opens contact 21ᵇ and stops further operation of motor 14. Also the voltage drop through the resistor 33 decreases, which increases the potential of the grid 37ᶜ. If the acceleration of the motor 10 has not yet been stopped by response to relay 21, the potential of the grid 32ᶜ decreases further until conduction through the tube 32 ceases and the potential of the grid 37$^c$ rises to increase the current through tube 37 to a value which energizes the relay coil 20$^a$ to close the contacts 20$^b$ and operate the motor 14 in the reverse direction to stop further increase in the speed of motor 10.

It should be pointed out that when the relay 16 responds as heretofore described, it closes the contacts 16$^c$ which short circuits the resistor 29, thereby reducing the potential of the cathode 26$^a$. This increases the potential of the grid 26$^c$ with respect to the cathode 26$^a$, thereby making the tube 26 more conducting and thus lowering the potential of the grid 35$^c$ so as to reduce the energization of the coil 21$^a$. As a result, the relay will open its contacts sooner than it would, were it not for the short circuiting of the resistor 29. This prevents hunting of the apparatus due to the inertia of the motor armature 14$^a$, as the motor 14 will be deenergized to stop further reduction of the resistor 13$^a$ before the potential of the grid 26$^a$ has reached the exact value corresponding to the terminal voltage of the tachometer 11.

If now the speed of the motor should increase above the desired value determined by the setting of contact 28$^a$, the potential of the grid 26$^c$ becomes more positive, thereby increasing the conduction of the tube 26 which decreases the potential of grid 32$^c$ and increases the potential of the grid 37$^c$ to that of the bus bar 23. Thus the tube 37 becomes sufficiently conducting to energize the relay coil 20$^a$, to close the contacts 20$^b$ and complete a circuit from line L$^1$ through contacts 20$^b$ and 16$^d$, coil 15$^a$, limit switch 13$^f$ which now is closed, to line L$^2$. This energizes relay 15 to complete a circuit from line L$^1$, through the motor armature 14$^a$, the reversing winding 14$^c$, contacts 15$^b$, to line L$^2$, and the pilot motor 14 is reversed to move the cross-head towards the right to increase the amount of resistance 13$^a$ connected in series with the armature of the motor 10, and thereby reduces its speed.

Upon response of the relay 15 it closes the contacts 15$^c$, which short circuits the anti-hunting resistance 27 to thereby increase the potential of the cathode 26$^a$ with respect to the grid 26$^c$, so that current of tube 26 will be reduced below the value corresponding to the voltage of the tachometer generator 11. As a result the voltage of the grid 32$^c$ is raised to increase the voltage drop through the resistor 33 and decrease the potential of the grid 37$^c$. This in turn causes deenergization of the relay coil 20$^a$ at a speed which is slightly less than the desired speed, so as to prevent overrunning of the motor 14 and overregulation of the speed of the motor 10.

The sensitivity of response of the system may be adjusted by adjustment of the contact 25$^a$ to make the cathode 32$^a$ more or less positive, the potential of the grid 32$^c$ with respect to the cathode 32$^a$ is thereby varied in the manner that increasing the positive potential of the cathode 32$^a$ reduces the sensitivity of response to the tachometer 11, while a decrease of the potential of the cathode 32$^a$ by movement of the contact 25$^a$ toward the bus bar 22 increases such sensitivity.

If it is desired to change the speed of the motor 10, it is merely necessary to shift the contact 28$^a$ of the speed-setting rheostat, as will be apparent from the foregoing description. Furthermore, the anti-hunting rheostats 27 and 29 may be adjusted so as to adjust the departure of the speed of the system from the desired speed at which the motor 14 is cut off to prevent overregulation or hunting.

While the system described is for the control of a non-reversing direct current motor, it is obvious that the invention may be applied to control systems for reversing motors and for alternating current motors of various types.

I claim:

1. In a controller, in combination, a mechanism, means to produce a voltage varying in accordance with an operating characteristic of said mechanism, four electron tubes, means to supply current to said tubes, means to impress said voltage upon the first of said tubes to vary its current in accordance with variations of said voltage, means to impress a voltage which is a function of the current of said first tube upon the second and third of said tubes to vary their respective current inversely with variations of the current of said first tube and to impress a voltage which is a function of the current of said third tube upon the fourth of said tubes to vary the current of said fourth tube inversely with the variations of the current of said third tube, and electroresponsive means connected to said mechanism and responsive to the currents of said second and fourth tubes to afford control of a function of said mechanism in accordance with variations of said operating characteristic.

2. In a controller, in combination, a mechanism, means to produce a voltage varying in accordance with an operating characteristic of said mechanism, four electron tubes, means to supply current to said tubes, means to impress said voltage upon the first of said tubes to vary its current in accordance with variations of said voltage, means to impress a voltage which is a function of the current of said first tube upon the second and third of said tubes to vary their respective currents inversely with variations of the current of said first tube and to impress a voltage which is a function of the current of said third tube upon the fourth of said tubes to vary the current of said fourth tube inversely with the variations of the current of said third tube, and electroresponsive means connected to said mechanism and responsive to the currents of said second and fourth tubes to produce an effect upon said mechanism varying in accordance with variations of said operating characteristic.

3. In a controller, in combination, a mechanism, means to produce a voltage varying in accordance with an operating characteristic of said mechanism, four electron tubes, means to supply current to said tubes, means to impress said voltage upon the first of said tubes to vary its current in accordance with variations of said voltage, means to vary the response of said first tube to said voltage, means to impress a voltage which is a function of the current of said first tube upon the second and third of said tubes to vary their respective currents inversely with variations of the current of said first tube and to impress a voltage which is a function of the current of said third tube upon the fourth of said tubes to vary the current of said fourth tube inversely with the variations of the current of said third tube, means to vary the response of said third tube to the voltage impressed thereon by said first tube, and electroresponsive means connected to said mechanism and responsive to the currents of said second and fourth tubes to afford control of a function of said mechanism in accordance with variations of an operating characteristic thereof.

4. In a controller, in combination, a mechanism, means to produce a voltage varying in accordance with an operating characteristic of said mechanism, four electron tubes, means to supply current to said tubes, means to impress said voltage upon the first of said tubes to vary its current in accordance with variations of said voltage, means to impress a voltage which is a function of the current of said first tube upon the second and third of said tubes to vary their respective currents inversely with variations of the current of said first tube and to impress a voltage which is a function of the current of said third tube upon the fourth of said tubes to vary the current of said fourth tube inversely with the variations of the current of said third tube, and electroresponsive means connected to said mechanism and responsive to the currents of said second and fourth tubes respectively to produce regulating effects opposite to each other upon said operating characteristic of said mechanism.

5. In a motor controller, in combination, a motor, means operative to control an operating characteristic of said motor, means connected to said motor and responsive to an operating characteristic thereof, four electron tubes, means to supply current to said tubes, means to subject the first of said tubes to control by said second mentioned means for varying its current in accordance with variations of said operating characteristic, means to impress a voltage which is a function of the current of said first tube upon the second and third of said tubes to vary their respective currents inversely with variations of the current of said first tube and to impress a voltage which is a function of the current of said third tube upon the fourth of said tubes to vary the current of said fourth tube inversely with the variations of the current of said third tube, and electroresponsive means responsive to the currents of said second and fourth tubes and connected to said first mentioned means to control the latter in accordance with the response of said second mentioned means.

6. In a motor controller, in combination, a motor, reversing means operative to control an operating characteristic of said motor, means connected to said motor and responsive to an operating characteristic thereof, four electron tubes, means to supply current to said tubes, means to subject the first of said tubes to control by said second mentioned means for varying its current in accordance with variations of said operating characteristic, means to impress a voltage which is a function of the current of said first tube upon the second and third of said tubes to vary their respective currents inversely with variations of the current of said first tube and to impress a voltage which is a function of the current of said third tube upon the fourth of said tubes to vary the current of said fourth tube inversely with the variations of the current of said third tube, and electroresponsive means responsive to the currents of said second and fourth tubes, respectively, arranged to energize said reversing means for operation in opposite directions selectively.

7. In a controller, in combination, a motor, reversible means operative to control an operating characteristic of said motor, means connected to said motor and responsive to said operating characteristic, an electric energy source, a first and a second electron tube, means to supply current to said tubes, means to subject said first tube to control by said second mentioned means to vary its current in accordance with variations of said operating characteristic, means to impress a voltage which is a function of the current of said first tube upon said second tube to vary the current of said second tube inversely with variations of the current of said first tube, and electroresponsive means connected to said reversible means and responsive to the current of said second tube to afford control of said reversible means in accordance with said variations of said operating characteristic.

8. In a controller, in combination, a motor, reversible means operative to control an operating characteristic of said motor, means connected to said motor and responsive to said operating characteristic, an electric energy source, a first and a second electron tube, means to supply current to said tubes, means to subject said first tube to control by said second mentioned means to vary its current in accordance with variations of said operating characteristic, means to impress a voltage which is a function of the current of said first tube upon said second tube to vary the current of said second tube inversely with variations of the current of said first tube, electroresponsive means connected to said reversible means and responsive to the current of said second tube to afford control of said reversible means in accordance with said variations of said operating characteristic, and means actuated by said reversible means to reduce the effect of said second mentioned means upon said first tube during response of said reversible means.

WILLIAM H. ELLIOT.

REFERENCES CITED

The following references are of record in the file of this patent:

UNITED STATES PATENTS

| Number | Name | Date |
|---|---|---|
| 1,353,815 | Meyer | Sept. 21, 1920 |
| 1,942,587 | Whitman | Jan. 9, 1934 |
| 2,237,015 | Stratton | Apr. 1, 1941 |
| 2,238,810 | Crever | Apr. 15, 1941 |
| 2,368,485 | Moyer | Jan. 30, 1945 |
| 2,267,404 | Garman | Dec. 23, 1941 |
| 2,303,110 | Cockrell | Nov. 24, 1942 |